United States Patent [19]
Juto et al.

[11] 4,008,777
[45] Feb. 22, 1977

[54] COMPACT SNOWMOBILE

[75] Inventors: Yasuro Juto, Iwata; Keisuke Suzuki, Hamamatsu, both of Japan

[73] Assignee: Yamaha, Hatsudoki Kabushiki Kaisha, Japan

[22] Filed: Oct. 20, 1975

[21] Appl. No.: 624,233

[30] Foreign Application Priority Data

Oct. 23, 1974 Japan .............. 49-122147

[52] U.S. Cl. .............. 180/5 R; 180/54 A; 180/68 R
[51] Int. Cl.² .............. B62D 27/00
[58] Field of Search .............. 180/5 R, 54 A, 68 R

[56] References Cited

UNITED STATES PATENTS

| | | | |
|---|---|---|---|
| 2,820,523 | 1/1958 | Earl | 180/68 R |
| 3,205,964 | 9/1965 | Henry-Biabaud | 180/68 R |
| 3,819,000 | 6/1974 | Larsen | 180/54 A |
| 3,901,335 | 8/1975 | Johnson | 180/54 A |

FOREIGN PATENTS OR APPLICATIONS 741,411 9/1943 Germany .............. 180/54 R

*Primary Examiner*—Robert R. Song
*Assistant Examiner*—John A. Pekar
*Attorney, Agent, or Firm*—Flynn & Frishauf

[57] ABSTRACT

A compact snowmobile comprises an engine room having a vertical cross section becoming smaller toward a forward end of the snowmobile, a driver seat having a cross section smaller in area than that of the rear end of the engine room, a radiator disposed at one of paired openings formed respectively at both side portions of the rear end portion of said engine room, and an air-intake passageway formed in a cowl constituting the upper wall of the engine room and intended to feed the air to the radiator.

10 Claims, 4 Drawing Figures

COMPACT SNOWMOBILE

BACKGROUND OF THE INVENTION

This invention relates to a compact snowmobile in which a liquid-cooled engine is installed, and more particularly to a radiator arrangement for this type of liquid-cooled engine of a compact snowmobile.

Generally, a snowmobile travels in cold areas, and therefore uses an air-cooled engine. This kind of air-cooled engine, however, has the drawbacks that it generates loud noises during its travel, and that it is likely to be overheated when the snowmobile is idling. It has been contemplated, therefore, to use in the snowmobile a liquid-cooled engine only producing gentle or low sounds and capable of effectively performing the engine cooling even when the snowmobile is idling or operating in a low load condition. As well known, a liquid-cooled engine requires a radiator for cooling the cooling medium, and this radiator occupies a relatively large space. It is, therefore, a very essential problem at what position of the snowmobile the radiator should be placed.

Generally, the snowmobile has an engine room situated at a forward part of the snowmobile body. This engine room is defined by a bottom cover extending toward a forward end of the snowmobile in an upwardly inclined manner and a cowl extending from substantially right above a rear end of the bottom cover toward the forward end of the snowmobile in a downwardly inclined manner. Accordingly, the vertical cross section of the engine room becomes smaller toward the forward end of the snowmobile. At a substantially central part of the engine room an engine is installed, and at one lateral side of the engine an automatic transmission mechanism of V-belt type is placed. In addition, exhaust and intake silencers each having a large capacity are received in the engine room. Even if, in the above-mentioned arrangement, an attempt is made to place the radiator at a forward part of the engine room, the installation of the radiator is difficult because of only a small space being left at said forward part of the engine room. Further, even if the radiator is forcibly installed under such circumstances, the forward end portion of the snowmobile tends to be buried under accumulated snow during its travel and this prohibits a cold wind from being introduced toward the radiator. On the other hand, when the radiator is disposed at a central part of the rear end portion of the engine room, hot air having absorbed the radiator heat is blown directly onto a driver and further a wind passageway must be provided in a manner bypassing the engine at the central part of the engine room to extend up to the radiator. Further, when the radiator is installed on the cowl, a large weight is applied onto the cowl and this disadvantageously results in decreasing the mechanical strength of the cowl.

In this type of snowmobile, it is also of great importance how the above-mentioned wind passageway for guiding a cold wind into the radiator should be provided. That is to say, where an inlet opening of the wind passageway is provided at a lower part of the engine room, there is a fear that the accumulated snow may enter into the wind passageway to prevent the flow of a cold wind. Further, where said inlet opening is provided at a lateral side of the engine room, it becomes difficult for the open air to enter the wind passageway during the travel of the snowmobile.

Since, as above described, various limitations are imposed upon the position at which the radiator and the wind passageway are to be installed or provided, difficulties have been presented in exploiting a practical compact snowmobile having a liquid-cooled engine installed therein.

SUMMARY OF THE INVENTION

The object of the invention is to provide a compact snowmobile with a liquid-cooled engine, in which a radiator can be disposed without varying the layout of other parts or appliances, and subject to an effective heat exchange.

The snowmobile of the invention comprises an engine room whose vertical cross section becomes smaller toward a forward end of the snowmobile, a driver seat having a cross section smaller in area than that of the rear end of the engine room, and a radiator disposed at one of paired openings formed respectively at both side portions of the rear end portion of the engine room. An air-intake passageway for feeding a cold wind to the radiator is formed in a cowl which comprises the upper wall of the engine room.

In the above-mentioned construction, the radiator is disposed in a relatively large space usually allowed to stand as dead space, situated at one side portion of the rear end portion of the engine room. For this reason, the radiator can be disposed with little variation in the layout of the conventional parts or appliances of the snowmobile and, even when made to have a relatively large capacity, does not interrupt the performance of the function of other parts or appliances. Further, hot air having deprived the radiator of its heat is allowed to flow along one lateral side of the driver seat and does not therefore interrupt the driver's driving operation. Since, on the other hand, the air-intake passageway is formed in the cowl comprising the upper wall of the engine room, it never happens that said passageway gets blocked by accumulated snow during the travel of the snowmobile, and as a result the radiator can be effectively cooled by the wind.

DETAILED DESCRIPTION OF THE EMBODIMENT

Figure 1:
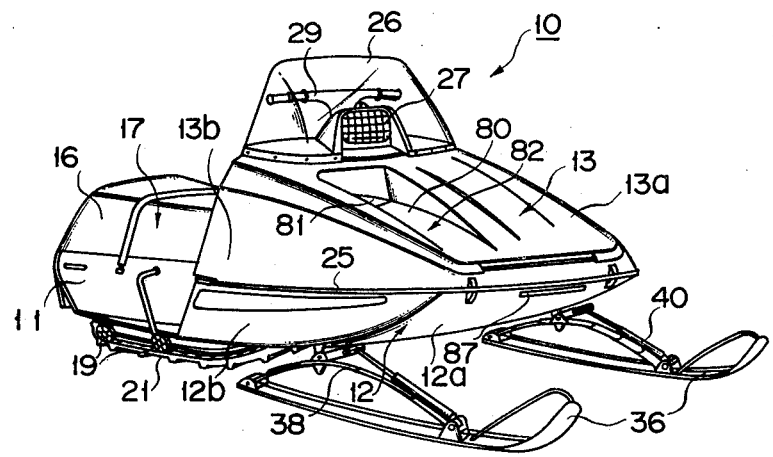
FIG. 1 is a perspective view, taken from the front side, of a compact snowmobile according to an embodiment of the invention.

In FIGS. 1 and 25 a snowmobile 10 comprises a frame assembly including a metal-made main frame 11 whose cross section is substantially an inverted U-shape, a metal bottom cover 12 fixed on the underside of a forward portion of the main frame, and a cowl 13 made of, for example, FRP (fiber reinforced plastics) and pivotally connected to a forward end of the bottom cover. Fixed on the main frame 11 are a cover 14 with a gauge board 15, whose cross section is substantially an inverted U-shape, and a longitudinally elongate seat member 16, said cover and seat member constituting a driver seat 17. Below the cover 14 is disposed a fuel tank 100, which is fixed on the main frame 11 and supplied with a fuel through a filler neck 101. A tail light 18 is mounted on a rear end of the seat member 16. Below the main frame 11 plural pairs of known guide wheels 19 (in the illustration only two are shown) and a pair of known guide rails 20 (in the illustration only one is shown) are supported on the main frame by a supporting means not shown. In the forward section of the snowmobile a known drive sprocket wheel not shown is disposed. An endless belt 21 having a number of projections 22 on its outer face is stretched over the guide wheels, guide rails and drive sprocket wheel in a conventional manner and is driven by the drive sprocket wheel being driven by an engine as later described.

Figure 3:
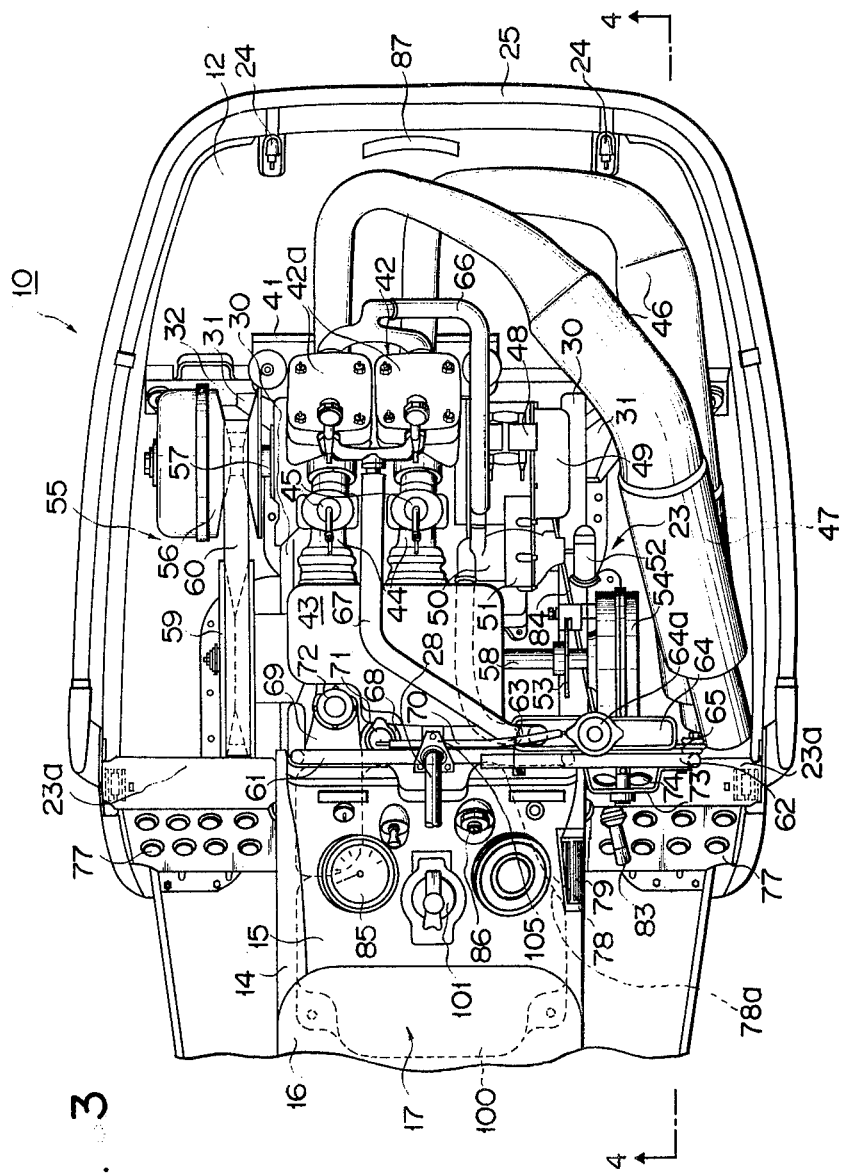
FIG. 3 is an enlarged plan view of an engine room of said snowmobile whose cowl is dismounted.
Figure 4:
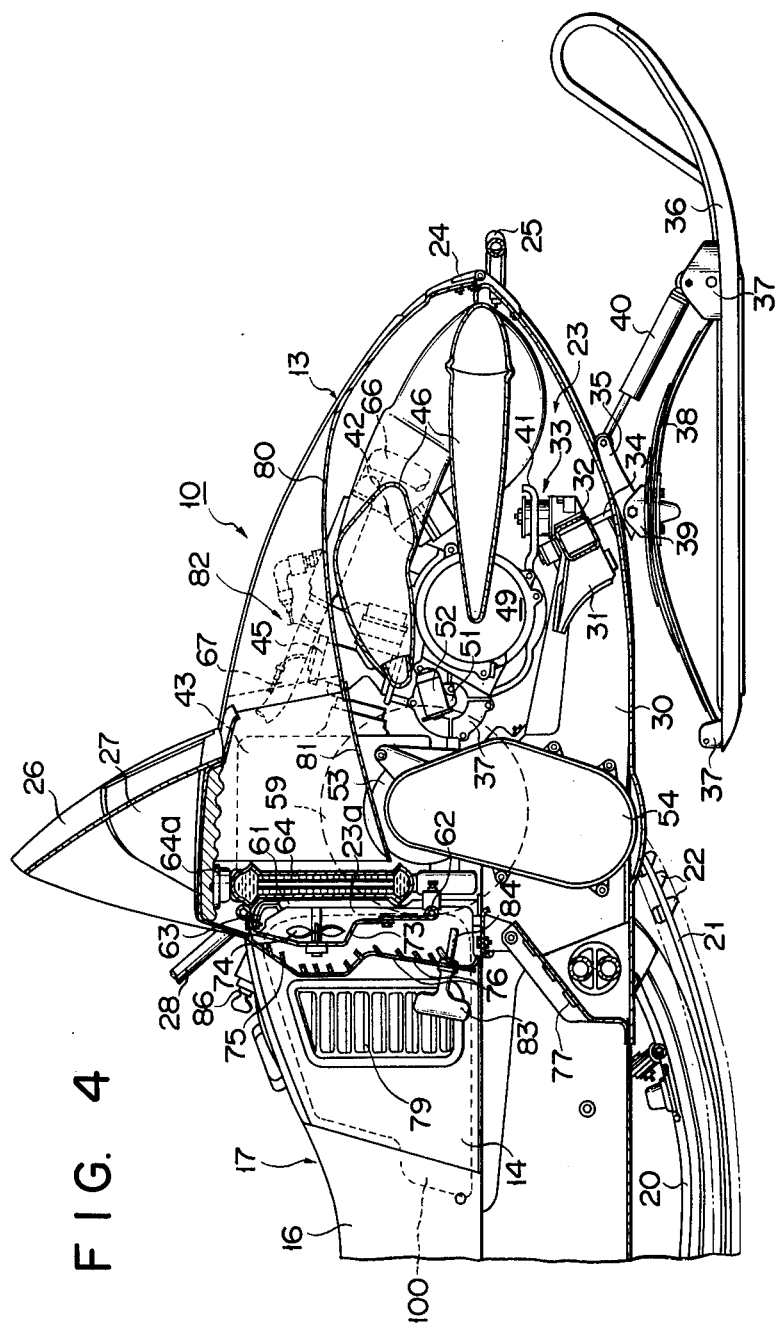
FIG. 4 is a sectional view, taken along the line 4—4 of FIG. 3, of said snowmobile having the cowl mounted thereupon.

As shown particularly in detail in FIGS. 3 and 4, the bottom cover 12 comprises a bottom plate portion 12a extending toward the forward end thereof in an upwardly inclined manner and a pair of side plate portions 12b rising, respectively, from both side edges of the bottom plate portion, while the cowl 13 comprises an upper plate portion 13a extending toward the forward end thereof from substantially right above a rear end of the bottom cover 12 in a downwardly inclined manner and a pair of side plate portions 13b downwardly extending, respectively, from both side edges of the upper plate portion 13a. Thus, the bottom cover 12 and cowl 13 define an engine room 23 having a vertical cross section becoming smaller toward the forward end of the snowmobile. The cowl 13 is pivotally connected to the upper edge portion of the forward end portion of the bottom cover 12 through hinges 24. Accordingly, the engine room 23 can be opened by rocking the cowl 13 upwardly.

Figure 2:
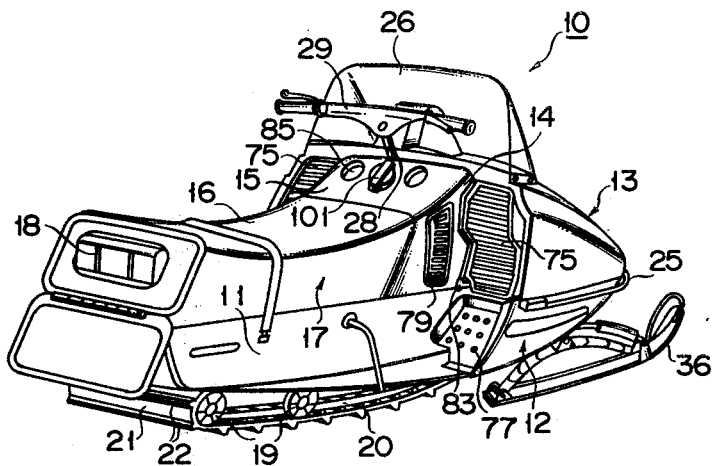
FIG. 2 is a perspective view, taken from the rear side, of the compact snowmobile of FIG. 1.

A bumper 25 is fixed to the bottom cover 12 so as to surround the outer periphery of the upper edge of the bottom cover 12. On the upper surface of the rear end portion of the cowl 13 is mounted a windshield 26, to a central portion of which is fixed a head light 27. A steering shaft 28 having a handle-bar 29 (FIGS. 1 and 2) at its upper end is attached to the frame assembly of the snowmobile in a later described manner, and is inserted at its lower end portion (not shown) into the engine room 23. A laterally extending supporting member 32 is fixed through a reinforcing member 31 to a pair of arms 30 extending from the forward end of the main frame 11. A known steering assembly 33 attached to the supporting member 32 is connected to the lower end (not shown) of said steering shaft 28 and has a pair of columns 34 penetrating through the supporting member 32 and bottom cover 12 to project downwardly. To members 35 provided, respectively, on lower ends of the columns 34 are connected, respectively, skis 36, each of which has a leaf spring 38 bridged between a pair of stays 37 fixed on the upper surface of the ski, said member 35 being connected to an apex portion of the leaf spring 38 through a bracket 39. A known oil damper 40 is disposed between the member 35 and the forward stay 37. When the handle bar 29 is rocked, the steering assembly 33 so acts as to cause the skis 36 to be rocked in the same direction in a conventional manner.

To the supporting member 32 is fixed an engine supporting plate 41, on which is provided a two-cycle internal combustion engine 42 of two-cylinder type. This engine is of a known liquid-cooled type. As shown in FIG. 3, the engine 42 is situated substantially at a central portion of the engine room 23 and has its cylinders laterally juxtaposed. On the rear side of the engine 42 is disposed an intake silencer 43, which is connected to the engine 42 through intake pipes 44 having carburetors 45, respectively. Exhaust pipes 46 connected to a forward portion of the engine 42 and having, respectively, exhaust silencers 47 are first extended forwardly of the engine room 23 and then passed along one lateral side portion of the engine room 23 to extend rearwardly. The exhaust pipes 46 communicate with a space (not shown) below the main frame 11 through means not shown and discharge an exhaust gas into this space. Between one side of the engine 42 and the exhaust pipes 46 is formed a space, within which are disposed an ignition coil 48, a recoil starter 49 attached to one end of the crank shaft not shown, a water pump 50 for a cooling system, a gear case 51 exerting a driving force to this water pump, and a lubricating oil pump 52 for a lubricating system of the engine. Also formed between one side of the intake silencer 43 and the exhaust pipes 46 is a space, within which are disposed a disk brake 53 and a chain case 54. The opposite side of the engine 42, the opposite side of the intake silencer 43, the inner wall of the bottom cover 12 and the inner wall of the cowl 13 cooperatively form a space, within which there is received a known V-belt type automatic transmission mechanism 55 having a relatively large capacity. This transmission mechanism 55 is provided with a primary sheave 56 mounted on a main drive shaft 57 coaxially connected to the other end of the crank shaft not shown. A secondary drive shaft 58 rotatably supported on the main frame 11 extends in parallel with the main drive shaft 57 and is provided at one end with a secondary sheave 59 corresponding to the primary sheave 56. A V-belt 60 is bridged between the sheaves 56 and 59. Each sheave comprises of a pair of conical members movable from each other along the drive shaft. The interval or spacing between these conical members is varied due to the action of centrifugal weight not shown, to thereby automatically vary the speed ratio between the sheaves 56 and 59 in a conventional manner. To the other end of the secondary drive shaft 58 are connected said disk brake 53 and chain case 54. This chain case 54 receives a chain mechanism which transmits a driving force to said sprocket wheel not shown to thereby drive said endless belt 21.

A rear part of the above-mentioned engine room 23 of the snowmobile 10 has a cross section larger in area than the cross section of the drive seat 17 including the cover 14 and the seat member 16. To describe this in more detail, the cover 14 of the driver seat 17 is smaller in width than the rear end of the engine room 23 and is situated substantially at a central part of the rear end of the engine room 23. For this reason, the engine room 23 has at opposite sides of its rear end, respectively, a pair of openings 23a defined by the cover 14 of the driver seat 17, bottom cover 12 and cowl 13. On the upper portion of the forward end of the main frame 11 is fixed an inverted U-shaped pipe frame 61, which is interposed between said fuel tank 100 and the engine room 23. The pipe frame 61 is used to fix the cover 14 and pivotally support the steering shaft 28 through a steering shaft support 105. To the pipe frame 61 is fixed a supporting member 62 comprised of a horizontally thrown U-shaped pipe through a bracket 63 and another bracket not shown. The supporting member 2 is biased to one side of the driver seat 17 (in this embodiment, it is biased to the right side in the case of viewing the supporting member 62 from the driver seat 17). A panel radiator 64 having a large number of water pipes and cooling fins is fixed to the supporting member 62 and also to the pipe frame 61 through a bracket 65 and another bracket not shown. Mutually opposite wide faces of the radiator 64 are directed forwardly and rearwardly of the snowmobile, respectively, and the left side portion of the radiator in the case of viewing the radiator from the driver seat 17 is faced to said cover 14 while the right side portion thereof is faced to the opening 23a provided sidewardly of the driver seat. A feed pipe 66 for cooling medium connected to a lower end of the radiator 64 is passed through said water pump 50 to be connected to known water jackets 42a through a forward end of the engine 42. Further, a return pipe 67 for cooling water connected at a rear portion of the engine to the water jackets 42a is connected to an upper portion of the radiator 64. Thus, the cooling medium such as antifreeze solution is fed by operation of the water pump 50 to the water jackets 42a of the engine through the feed pipe 66 and then fed back to the radiator 64 through the return pipe 67. A cap 64a is fitted to a filler neck of the radiator, and is removed when cooling medium is supplied into the radiator. On the left side of the radiator in the case of viewing it from the driver seat 17 are disposed an auxiliary cooling-medium tank 68 and a lubricating oil tank 69, which are mounted on the main frame 11. The auxiliary tank 68 is connected to a filler neck of the radiator 64 through an overflow pipe 70. The tank 69 is connected to said lubricating oil pump 52 through a pipe not shown. Filler necks of the tanks 68 and 69 are closed by detachable caps 71 and 72, respectively.

On the rear side of the radiator 64 is disposed a cross-shaped attachment frame 73, a horizontal arm of which is fixed to the respective vertical pipe portions of the pipe frame 61 and the supporting member 62, and a vertical arm of which is fixed to the upper and lower horizontal pipe portions of the supporting member 62. The attachment frame 73 is provided with a cooling fan 74 having an electric motor connected to an electrical system not shown. Preferably, the cooling fan 74 is always allowed to operate throughout the operation of the engine 42, or alternatively is designed to operate only when the temperature of water within the radiator 64 rises up to a level higher than a predetermined level. In the latter case, a cooling system including the radiator 64 is provided with a known thermostat, which transmits a signal to the cooling fan 74.

To a rear end of said cowl 13 are fixed a pair of cover plates 75, which extend downwardly so as to close the openings 23a at opposite sides of the rear end of the engine room 23. The cover plates 75 respectively have a large number of ventilating openings 76 for permitting communication of the engine room 23 with the open air and the cover plate disposed at the right side of the driver seat 17 is situated rearwardly of the cooling fan 74. A pair of step members 77 are fixed to the main frame 11 in a manner situated below said pair of cover plates 75, respectively. A forward end portion of the tank 100 is recessed at one side to form a depression 78a, which defines an exhaust passageway 78 in cooperation with said cover 14. This exhaust passageway 78 is opened at one side to a rear face portion of the radiator 64 and is allowed at the opposite side to communicate with the open air through an exhaust opening 79 formed in the cover 14.

A right side portion of the upper plate portion 13a of said cowl 13 is downwardly recessed to form a depression 80 whose forward end is directed in the advancing direction of the snowmobile and whose rear end is opened to the engine room 23. A duct plate 81 having a U-shaped cross section is fixed to a lower part of the cowl 13 and is extended from the rear end opening of the depression 80 up to the very nearest point to a forward face of the radiator 64. The duct plate 81 has at its rear end an opening having substantially the same area as that of said forward face of the radiator 64. Thus, the depression 80 and the duct plate 81 cooperatively form a continuous, air-intake passageway 82. It thus follows that the air-intake passageway 82 is opened forwardly of the snowmobile and is extended up to the radiator 64.

The cover 14 retains at its right side a starter lever 83 connected to said recoil starter 49 through a rope 84. A gauge board 15 has a speed indicator 85 and a key hole 86 for a main switch not shown. At a forward end portion of the bottom cover 12 is formed a secondary opening 87 for taking the air in the engine room 23 during the travel of the snowmobile.

When, in the above-mentioned construction, the engine 42 is driven, the water pump 50 feeds a cooling medium from the radiator 64 to the water jackets 42a of the engine 42 thereby to allow the engine 42 to be effectively cooled. The heat of the cooling water due to the heat of the engine 42 is radiated by the radiator 64. While the snowmobile is travelling at a medium or high speed, the wind is blown onto the radiator 64 through said air-intake passageway 82 and removes heat from the radiator, and then flows rearwardly from the side of the driver seat 17, on one hand through the openings 76, and on the other hand through the exhaust passageway 78 and the exhaust opening 79. Since, at this time, the air is allowed to pass through the radiator 64 not only due to the positive pressure produced at the forward portion of the snowmobile but also due to the negative pressure produced at the rearward portion of the cover late 75, the cooling effect of the air upon the radiator 64 is extremely high. Further, hot air having absorbed the radiator heat escapes sidewardly of the driver seat 17 and therefore is not blown directly to the driver.

While the snowmobile is idling, or travelling at a low speed, the amount of air introduced into the air-intake passageway 82 due to the above-mentioned positive pressure is small and the radiator temperature therefore tends to be somewhat raised. In such a case, however, said cooling fan 74 is so rotated as to cause the air to be forcedly attracted thereinto from the air-intake passageway 82, thereby to allow the radiator 64 to cool effectively.

As above explained, the radiator 64 of the snowmobile is disposed in a space at one side of the rear end portion of the engine room 23 conventionally allowed to stand as a dead space, and said space is opened sidewardly of the driver seat through the opening 23a. For this reason, a radiator 64 having a relatively large capacity can be used without varying the layout of various usual parts or appliances, and hot air having absorbed the radiator heat is prevented from being blown directly onto the driver. Since the air-intake passageway 82 is situated at the upper portion of the snowmobile and opened in the travelling direction of the snowmobile, it never happens that this passageway 82 gets blocked by accumulated snow during the travel of the snowmobile, and the travelling wind can be taken in by the passageway 82 effectively. Further, the engine room 23 for receiving the engine 42 is almost completely isolated by the cowl 13 and duct plate 81 from a travelling wind path leading to the radiator 64, which serves to lessen the drawback that the engine noise comes out into the exterior from the air-intake passageway as in the conventional case. Further, if, upon checking the engine 42, the cowl 13 is pivotally rocked upwardly, the duct plate 81 is moved jointly with the cowl 13 and therefore does not become an obstruction to checking the engine.

What we claim is:

1. In a compact snowmobile comprising an engine room defined at least by a bottom cover fixed to a main frame and a cowl disposed upwardly of said bottom cover, and having a vertical cross section becoming smaller toward a forward end of said snowmobile, a liquid-cooled engine fixed to said main frame and received within said engine room, and a driver seat extending rearwardly from a substantially central portion of the rear end of said engine room and having a cross section smaller in area than a vertical cross section of the rear end of said engine room, wherein the rear end of said engine room is closed at its central portion by said driver seat and has at opposite lateral sides of said driver seat, respectively, a pair of side openings which are opened rearwardly, the improvement further comprising a radiator coupled to said engine for cooling the liquid cooling medium thereof, said radiator being disposed at one side portion of the rear end of said engine room and at least partially extended to one of said side openings, said cowl having an air-intake passageway one end of which is opened in the travelling direction of said snowmobile and the other end of which is opened toward the forward face of said radiator.

2. A snowmobile according to claim 1, wherein said air-intake passageway comprises a depression formed in the upper face of said cowl and having at its rear end a rear end-opening which is opened into said engine room, and a duct member fixed to the lower face of said cowl and extended from said rear end-opening of the depression to the forward face of said radiator.

3. A snowmobile according to claim 1, wherein said radiator partially faces the forward face of said driver seat; and said driver seat has an air exhaust passageway one end of which is opened to the rear face of said radiator and the other end of which is opened sidewardly of said driver seat.

4. A snowmobile according to claim 3, wherein said driver seat includes a cover member whose cross section is an inverted U-shape and which has a penetration opening at one side wall thereof, and a fuel tank disposed below said cover member and defining a spacing with the inner wall of said cover member; and said air exhaust passageway comprises said spacing and said penetration opening.

5. A snowmobile according to claim 1, wherein said cowl is pivotally connected at its forward end to the forward end of said bottom cover and has at its rear end a pair of cover plates closing said pair of side openings of said engine room, respectively; and said cover plate on the side of said radiator is situated rearwardly of said radiator and has a plurality of ventilating openings.

6. A snowmobile according to claim 5, further comprising a cooling fan for causing air to forcedly flow from said air-intake passageway to said radiator, said cooling fan being attached to said main frame and situated between said radiator and said cover plate on the side of said radiator.

7. A snowmobile according to claim 6, wherein said cooling fan is always operated throughout the operation of said engine.

8. A snowmobile according to claim 6, including means for operating said cooling fan when the radiator temperature is raised up to a level higher than a predetermined level.

9. A snowmobile according to claim 1, wherein said engine has an automatic transmission mechanism situated at one side of said engine; and said radiator is disposed at the opposite side of said engine.

10. A snowmobile according to claim 1, further comprising a cooling fan for causing air to forcedly flow from said air-intake passageway to said radiator.

* * * * *